United States Patent
van Rotterdam et al.

(10) Patent No.: US 10,049,041 B2
(45) Date of Patent: Aug. 14, 2018

(54) MEMORY CENTRIC DATABASE ARCHITECTURE

(71) Applicant: EMC Corporation, Hopkinton, MA (US)

(72) Inventors: Jeroen M. van Rotterdam, Berkeley, CA (US); Michael Mohen, Millington, MD (US); Ravi Ranjan Jha, Bangalore (IN); Sreecharan Shroff, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 372 days.

(21) Appl. No.: 14/814,474

(22) Filed: Jul. 30, 2015

(65) Prior Publication Data

US 2017/0031818 A1    Feb. 2, 2017

(51) Int. Cl.
| | | |
|---|---|---|
| *G06F 17/30* | (2006.01) |
| *G06F 12/02* | (2006.01) |
| *G06F 8/41* | (2018.01) |
| *G06F 9/455* | (2018.01) |
| *G06F 9/445* | (2018.01) |
| *G06F 9/46* | (2006.01) |

(52) U.S. Cl.
CPC ............ *G06F 12/0269* (2013.01); *G06F 8/41* (2013.01); *G06F 9/44521* (2013.01); *G06F 9/45504* (2013.01); *G06F 9/45558* (2013.01); *G06F 9/461* (2013.01); *G06F 17/30327* (2013.01); *G06F 17/30336* (2013.01); *G06F 2009/45583* (2013.01); *G06F 2212/1041* (2013.01); *G06F 2212/152* (2013.01); *G06F 2212/2022* (2013.01); *G06F 2212/7205* (2013.01)

(58) Field of Classification Search
CPC ...... G06F 2009/45583; G06F 17/30336; G06F 2212/2022; G06F 2212/7205
See application file for complete search history.

(56) References Cited

U.S. PATENT DOCUMENTS 6,341,288 B1 *  1/2002  Yach ................. G06F 17/30595
2003/0200526 A1 * 10/2003  Arcand ................. G06F 9/465
                                                              717/102

* cited by examiner

*Primary Examiner* — Cheryl Lewis
(74) *Attorney, Agent, or Firm* — Barry N. Young

(57) ABSTRACT

A system and method for Java object storage and retrieval in a non-volatile all flash memory database. Bean annotations define the attributes of objects and object classes that are created using a Java compiler in an all flash Java runtime environment. Object indexes are created based upon these attributes, and a Java object query language using the indexes is employed to locate objects in the all flash memory database. A new transactional model is provided for managing objects and memory in the all flash memory database, and a new garbage collector deletes objects and reclaims memory.

20 Claims, 8 Drawing Sheets

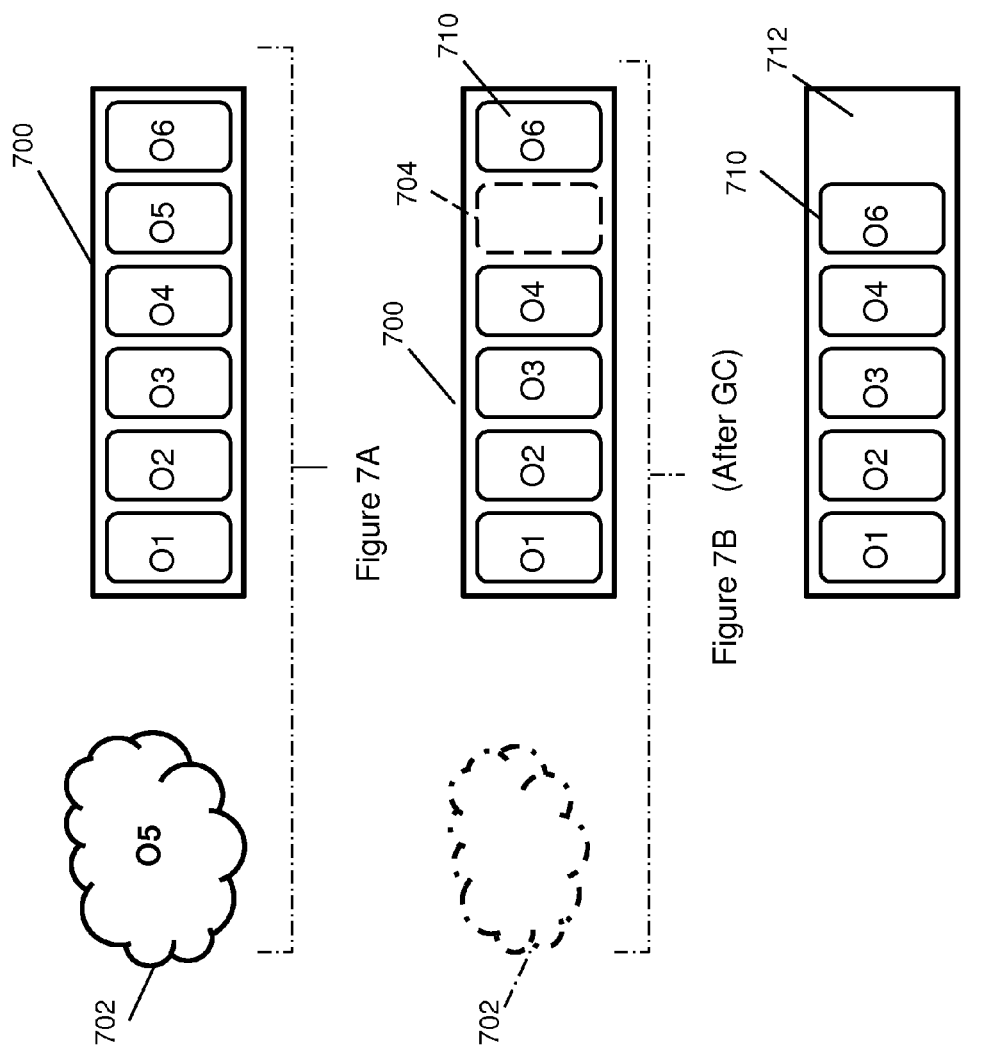

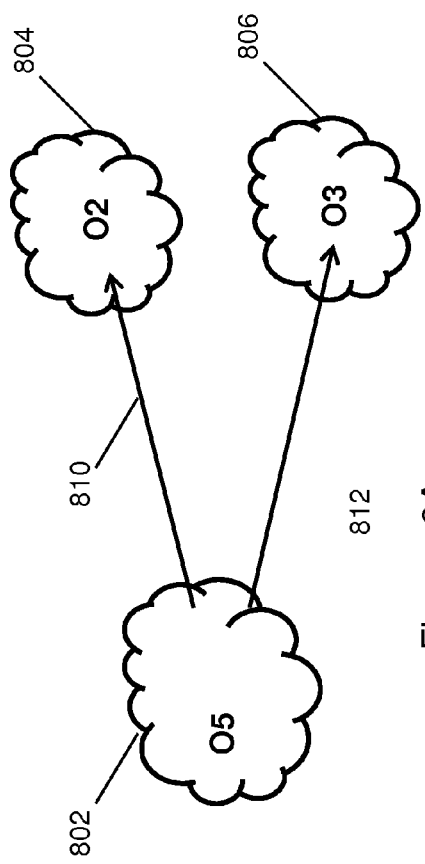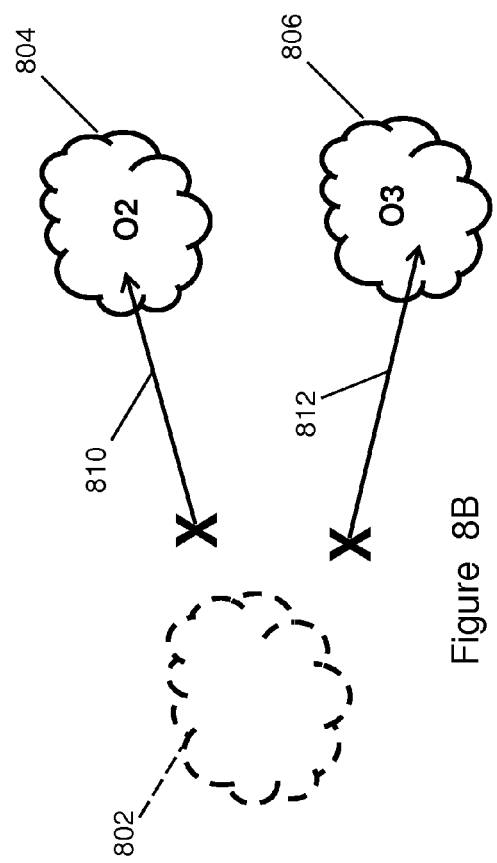
Figure 8A
Figure 8B

MEMORY CENTRIC DATABASE ARCHITECTURE

BACKGROUND

This invention relates generally to data storage systems and methods, and more particularly to persistent non-volatile flash memory database storage systems and methods.

The read/write performance of persistence semiconductor storage, such as flash memory, is increasing to the point where it may soon replace internal memory in some applications. The expectation is that over time non-volatile flash memory will become as fast as DRAM. This will open a number of unique and different applications for flash memory in storage systems such as databases. However, there are a number of different problems that must be addressed before flash memory can be used efficiently as a database, and this will require a different model for programming language compilers, such as Java, for example, and a dramatically different approach to storage system architectures.

Traditional Java runtime environments (JREs) do not currently have the capability of storing data objects persistently. All objects are created at runtime by constructors and stored in volatile memory (e.g., RAM). This is disadvantageous for flash memory because persistent objects in non-volatile memory need to be created, deleted and managed in an entirely different manner. An advantage to creating transient objects in volatile memory is that non-referenced objects are automatically cleared out when the application shuts down or when they are swept out by a garbage collection process, which automatically frees memory at runtime as well. This is not the situation with flash memory where affirmative action is necessary to delete persistent objects and free memory.

Further, since the number of objects in a database can be significant, there is a problem as to how to efficiently find and retrieve an object in a flash array based on a query definition. Other problems that need to be addressed when using flash memory is how to determine an object's location so that it can be referenced, and how to delete stored objects and free memory. Finding objects in persistent memory requires different indexing approaches than those used with volatile memory. Indeed, where non-volatile memory is substituting for internal memory, it is necessary to rethink traditional architectures and technologies.

Traditionally databases serialize objects into table structures using dedicated server products, and offer other advantageous capabilities such as a transactional model, a consistent view over the data, query languages such as SQL, the capability to update individual data fields, and index structures to facilitate and speed up searches. These capabilities involve significant costs that slow software solutions. The attendant serialization/de-serialization process typically goes over various hubs and caches which leads to significant overhead on both CPU and internal memory, inefficiencies and increased storage costs. This is not appropriate for flash memory storage where objects are always persisted in memory. A different transaction model for managing objects, and different approaches to retrieving and deleting objects are needed.

It is desirable to provide new memory centric database architectures based upon persistent flash memory that address the foregoing and other problems with using flash memory for database architectures, and it is to these ends that the present invention is directed.

BRIEF DESCRIPTION OF THE DRAWINGS

FIGS. 7A-C illustrate an embodiment of a process in accordance with the invention for deleting objects and for compacting memory; and FIGS. 8A-C illustrate different approaches in accordance with the invention for deleting persistent objects in an all flash database.

DESCRIPTION OF PREFERRED EMBODIMENTS

The invention provides a new and unique memory centric database architecture using persistent non-volatile flash memory that combines the advantageous characteristics, flexibility and versatility of conventional databases with the speed, security and convenience afforded by flash memory, while achieving improved performance over conventional memory. In accordance with the invention a new type of compiler and runtime optimized for flash storage technologies are provided. The invention is especially well adapted for use with the Java programming language and for a database application, and will be described herein in that context. Accordingly, in describing embodiments of the invention this specification will use terms such as "all flash" in connection with describing an "all flash Java compiler" (AFJC), an "all flash Java runtime environment" (AFJRE) and an "all flash database" (AFDB). It will be appreciated, however, that Java-based storage systems and methods are illustrative of only one utility of the invention, and that the invention has applicability as well to other programming languages, environments, and applications.

Figure 1:
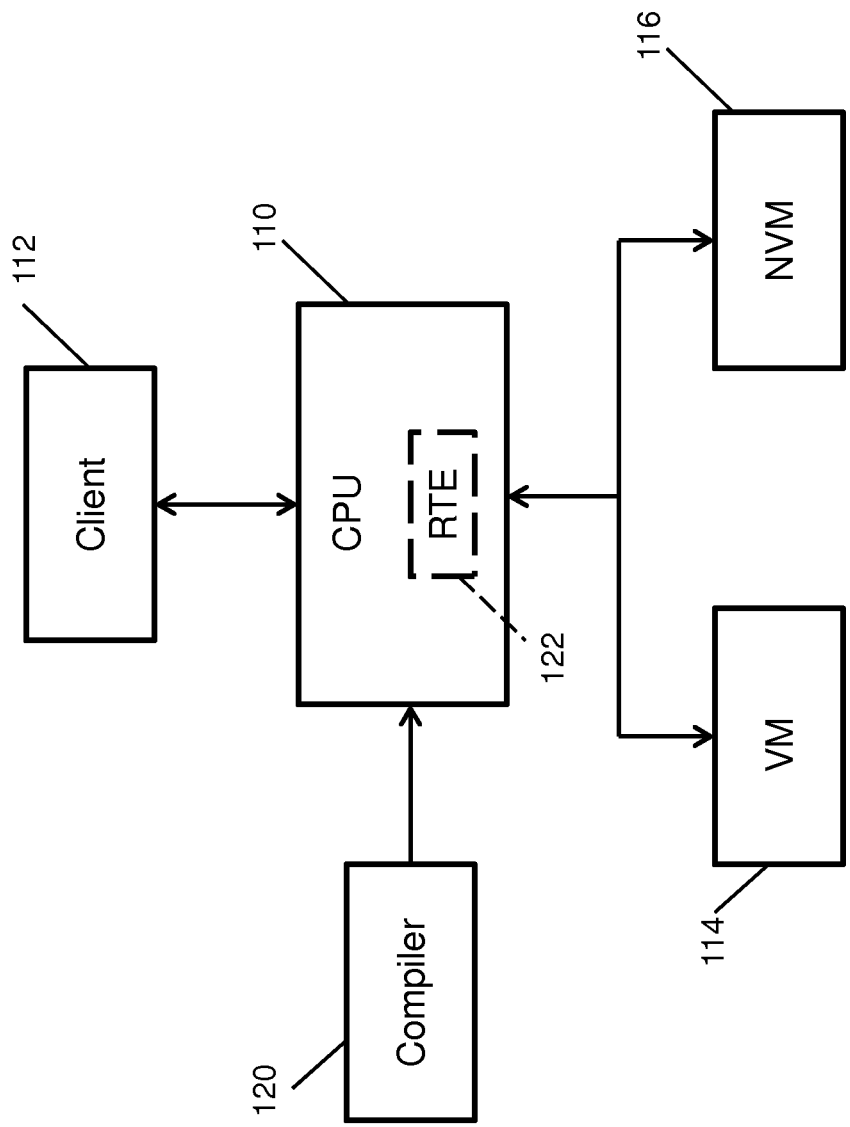
FIG. 1 is a block diagram illustrating the architecture of a system that provides an all flash compiler and runtime environment in accordance with an embodiment of the invention.

FIG. 1 illustrates the architecture of a system providing a compiler and runtime environment for an all flash memory storage array in accordance with an embodiment of the invention. As shown in the figure, the system comprises a computer system (CPU) 110 connected to a client 112, volatile memory 114 and nonvolatile memory 116. The volatile and nonvolatile memories may comprise computer readable media for storing control programs comprising executable instructions for controlling the operation of the computer system 110. The nonvolatile memory may comprise an all flash storage array forming a database. A compiler 120, which may be a Java compiler, compiles Java instructions that are tailored in accordance with the invention for a flash persistent storage array. The instructions are executed by the computer system 110 to create a Java runtime environment 122. The Java compiler will be referred to as an all flash Java compiler (AFJC), and the Java runtime environment will be referred to as an all flash Java runtime environment (AFJRE).

As will be described in more detail below, the invention affords a database architecture and persistent data model that is quite different from traditional database architectures and models. Traditional databases are organized around tables. Storing and accessing data in such traditional databases requires multiple steps to move data objects between memory locations and various page and memory caches. In contrast, in accordance with the invention, a new persistent data model is provided where data objects are stored directly into and managed directly in persistent memory. This is unlike so-called object databases which attempt to make data management transparent by mapping the database to different known data models. Objects which are to be stored persistently are explicitly defined and identified upon creation, and objects may be explicitly indicated for deletion. Additionally, the invention provides a transaction management model where multiple objects may be modified atomically in a single transaction. To implement the desired new real time behavior, the AFJC of the invention embodies new and different Java compiler functionality tailored to the persistent objects and transaction management model of the invention, as will be described.

The AFJC (compiler) 120 may make decisions as to which objects to store in volatile memory and which to store in persistent flash nonvolatile memory upon creation of the objects based upon directions provided to the compiler. There are different approaches which may be used to provide this functionality. In accordance with a first approach, all objects may be stored in nonvolatile memory 116 by default. When new objects are created, they may be automatically stored in the flash array. The advantage of this approach is that existing applications may benefit from the AFJRE without the need for recompiling. Since with this approach there is no distinction between transient and persistent objects, a new garbage collector (GC) that cleans up unwanted objects may be created in the AFJRE with a new heap implementation to store objects in the flash array 116.

In accordance with a second preferred approach, directions are provided to the compiler as to which objects are to be stored in nonvolatile memory, and this is included in the object definitions. Bean annotations may be used to indicate which objects should be stored in the flash array and which objects should be stored in volatile memory. Bean annotations may be applied to class definitions and are advantageous in enabling additional information to be included as to how an object or a class of objects are to be persisted, as for instance:

```
@flash-storage
Public Class MyObject {
    String name;
    Date date;
}
```

Additionally, applications may be recompiled and the bean annotations added to the programs. This approach also affects other aspects of the AFJRE. These include deleting objects, and finding objects.

Objects in persistent memory are not automatically deleted. By default, an unreferenced object may be deleted by a garbage collector. To avoid deletion of a wanted object, a garbage collection approach may be employed where an object that is referenced is spared from deletion. Additionally, since a persistent object cannot be used if it cannot be found, the invention preferably implements indexing and querying schemes. Indexing will provide at least one reference to an object that can prevent it from being deleted. Alternatively, Java commands such as object.delete( ) and object.finalize( ) may be used to control a garbage collector to delete particular objects from the flash array. Querying approaches may use indexes created by index definitions to find objects in the storage array, as will be described.

Figure 3:
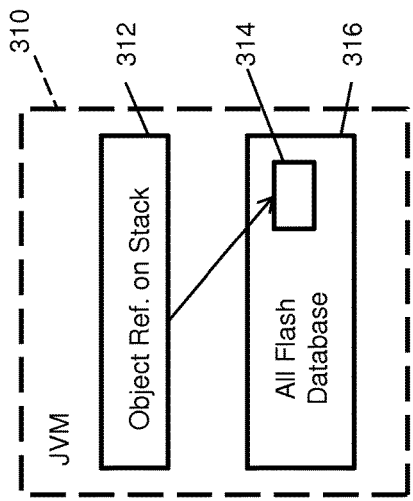
FIG. 3 contrasts an approach to an all flash database in accordance with the invention to the conventional database of FIG. 2.
Figure 2:
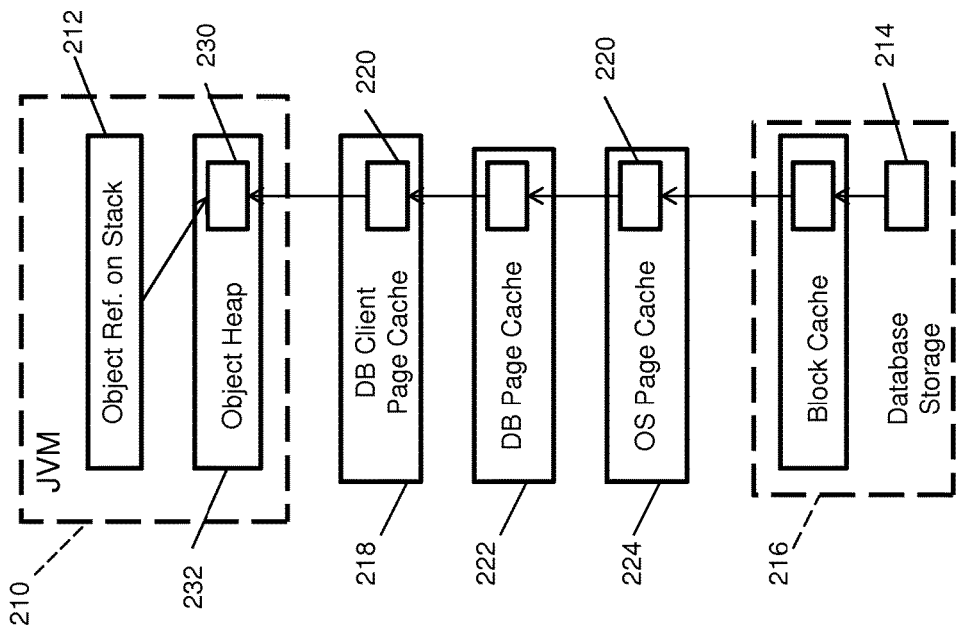
FIG. 2 illustrates a conventional approach to database storage.

FIGS. 2 and 3 illustrate and contrast the differences between retrieving an object from a traditional database into an in-memory data structure (FIG. 2) and accessing a persistent object in the AFDB of the invention (FIG. 3).

FIG. 2 illustrates the sequence of steps and the attendant overhead and inefficiencies incurred in retrieving an object from a traditional database storage array into an in-memory data structure. As will be appreciated, the degree of inefficiency will depend upon the actual implementation of the database. Referring to FIG. 2, a constructor may create a reference on the stack 212 of a Java virtual machine (JVM) 210 to access data pages 214 of an object from a storage array 216. A database client 218 may request the data pages corresponding to the object from a database server 222. The database server operating system 224 may retrieve the data pages 214 from the storage device and store the pages in a block cache 230 of the storage array. The pages may then be transported to the operating system 224 page cache and to the database server 222 page cache. The database client 218 may then populate the pages to its client page cache. The query engine in the Java virtual machine may process the pages and create a result set 230 which is populated into a Java object heap 232 of the Java virtual machine.

In contrast, in accordance with the invention as shown in FIG. 3, a constructor may create a reference on a stack 312 of a Java virtual machine (JVM) 310 to access a persistent object 314 from an all flash array 316. The JVM 310 may access the object 314 directly without the necessity for the number and types of translation operations that are required of the traditional database of FIG. 2. Thus, the operation does not require the multiple translations or incur the attendant inefficiencies as does the traditional database. Upon accessing the object, the JVM 310 may then use or modify the object as needed.

Java offers an object query language (OQL) for finding objects in a memory heap. The invention may use this capability in combination with an indexing system to locate objects in the all flash array based upon a query definition. There are several approaches that the invention may use for locating objects. One approach is a full scan of the entire flash array and testing of all objects. Since the number of objects in the array may be large, this could be inefficient. Accordingly, a full scan is normally used sparingly and preferably only for one-off searches. Moreover, since there are no object boundaries in the flash array, the invention may create a construct to register the object on the array with the registry using the object's starting location and its length in its number of bits. A full scan would then scan the entire registry to locate the right object.

Figure 4:
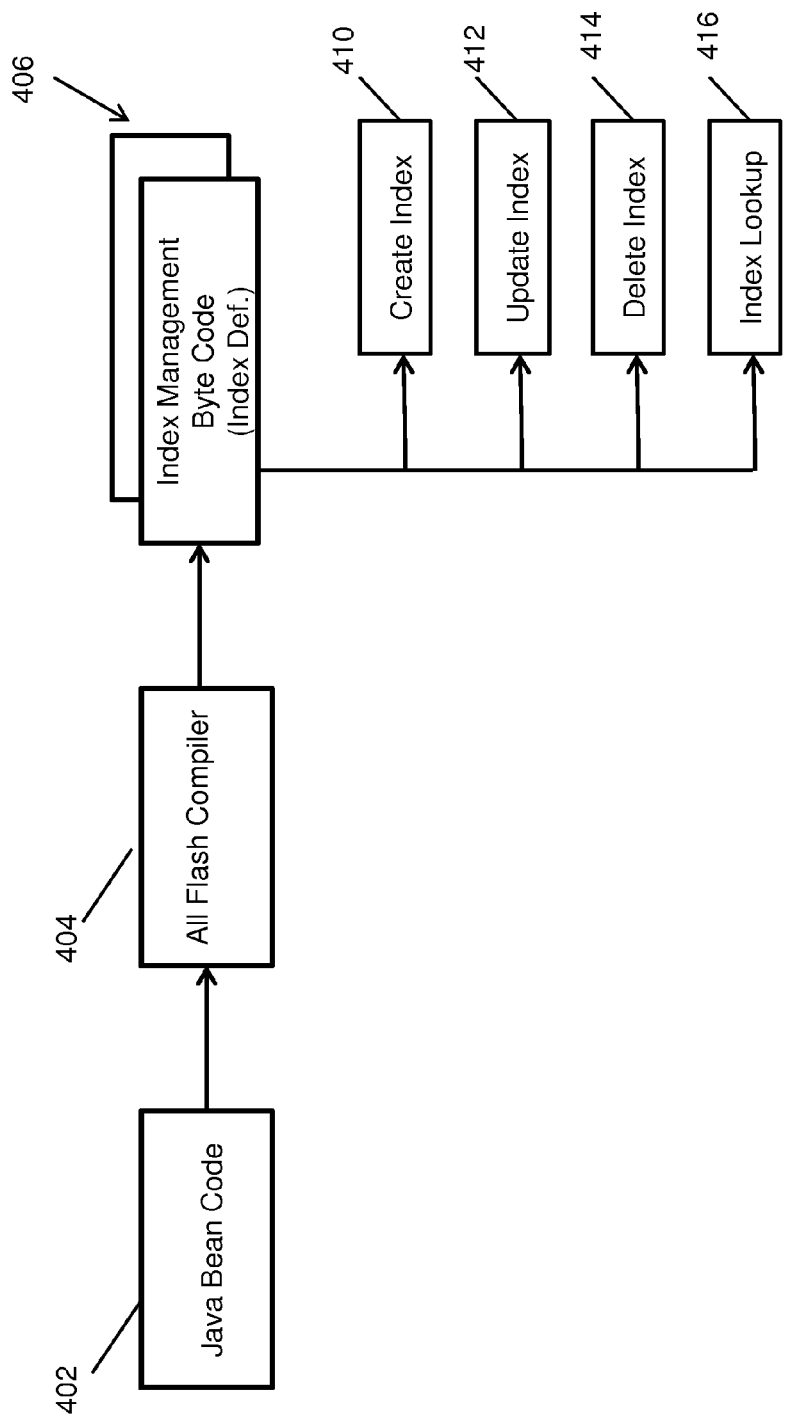
FIG. 4 illustrates the operation of an all flash compiler in accordance with the invention for indexing persistent objects.
Figure 5:
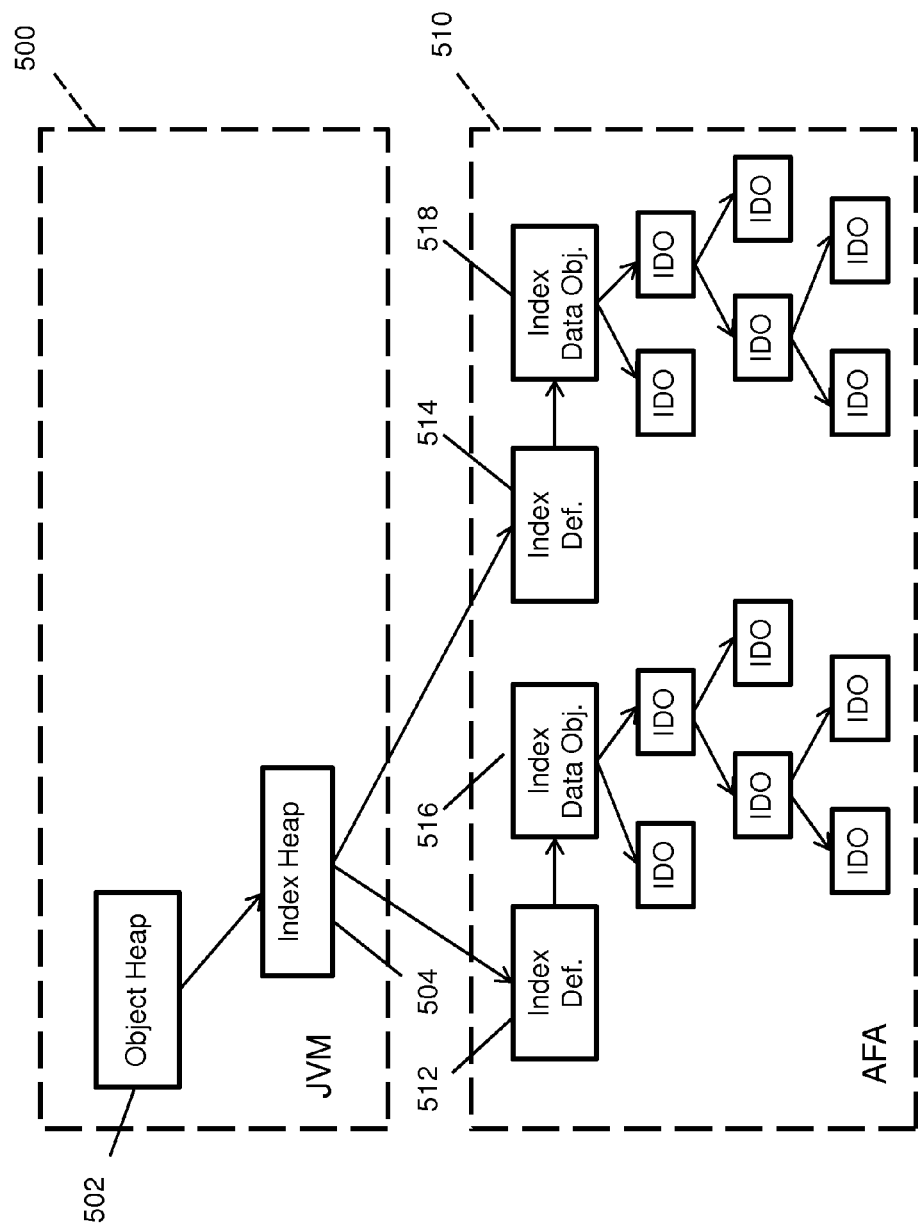
FIG. 5 illustrates an embodiment of an index structure of an all flash database in accordance with the invention.
Figure 6:
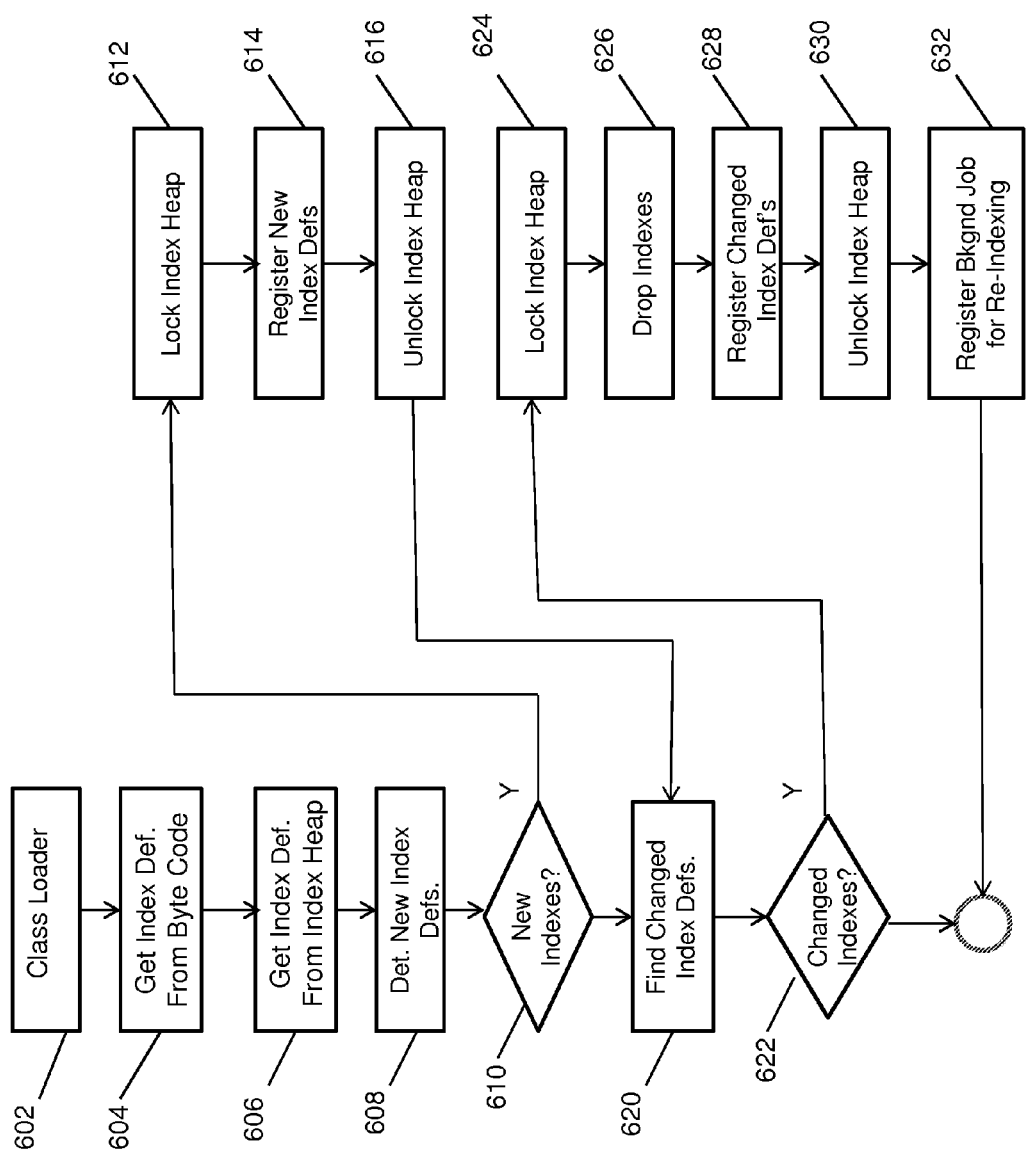
FIG. 6 illustrates an embodiment of a process in accordance with the invention for managing objects in the all flash database.

A second preferred and more efficient approach used by the invention is to create one or more dedicated index structures, such as B-trees or inverted indexes, to enable objects to be located more easily. Bean annotations on object definitions can be used to identify object properties that may be used to create the index structures. The index structures may be stored in the storage array database, and registered in the registry so they may be found. A single bean definition may hold multiple indexes, and generate multiple corresponding code chunks for index management of the individual indexes. Indexes may be single key, composite key or inverted indexes, and may be updated synchronously or asynchronously. Single key indexes are defined at the object attribute level, while composite indexes are defined at the object level. FIGS. 4-6 illustrates an embodiment of this approach.

Referring to FIG. 4, index definitions may be defined in the Java bean code 402 and supplied to the all flash compiler 404 of the invention which will read the annotations to create index management byte code at 406. The byte code may create an index 410, update an index 412, delete an index 414 or perform an index lookup 416. The generated code may maintain information as to from which index definition it originated to handle class definition and index definition changes. The index management byte code may, therefore, store index information comprising a combination of a class name, class-version identifier and the index definition. An example of a bean annotation for single key synchronous B-tree index is:

```
@flash-storage
Public Class MyObject {
int id; @flash-index(synchronous, btree)
String name;
Date date;
}
```

An example for a composite key synchronous index is:

```
@flash-storage
@flash-composite-index(synchronous, btree)[id,date]
Public Class MyObject {
int id;
String name;
Date date;
}
```

An example for an invented asynchronous index is:

```
@flash-storage
@flash-composite-
index(synchronous,
btree)[id,date] Public
Class MyObject {
int id;
String name; @flash-
index(asynchronous,
inverted) Date date;
}
```

Examples of index definitions are:

```
"com.emc.ecd.MyObject", 123456, flash-composite-
index(synchronous, btree)[id,date], IndexByteCode
"com.emc.ecd.MyObject", 123456, flash-index(synchronous,
btree)[id], IndexByteCode
```

The class-version identifier is generated by the Java runtime based on the class definition, and is version aware. It may be used to quickly detect whether the class has changed during class loading in the AFJRE. The AFJRE will create and register the index structures in the all flash array upon loading the classes at runtime. This registration process need only happen once, and is bound to the class version identifier with which it is registered with the index. Index structures are preferably managed in an object heap in a persistence map to quickly locate index structures. This process and the resulting index structures in the all flash array are illustrated in FIG. 5.

As shown in FIG. 5, the Java virtual machine 500 may include an object heap 502 and an index heap 504. The object heap and the index heap may manage the persistent index structures in the all flash array 510. The all flash array may have index definition structures 512 and 514 for storing index structures for pluralities of index data objects (IDOs) headed by index data objects 516 and 518, respectively. The figure illustrates only two such data object structures, but it will be appreciated that there may be many such data object structures.

The invention affords processes for creating, updating and deleting of objects and their associated indexes. When objects are created, the AFJRE may determine whether there are associated indexes with that object class definition. If so, the indexes will also have to be updated for the new data. The AFJRE may look up the appropriate index definitions from the index heap, find the references to the index definitions, and update the persisted index data structures. When objects are modified, the AFJRE will keep track of the changes in the bean and will determine whether there are associated indexes that need to be updated. It will look up the appropriate index definitions from the index heap, find the reference to the index data objects, and update the persistent index data structures. When objects are deleted, the AFJRE will determine the associated indexes that need to be updated and delete the index entries for the deleted objects. The indexes may be probed directly using a lookup method. The AFJRE may find an index definition in the index heap, load the index byte code, and execute a lookup method for the index.

FIG. 6 illustrates an example of these processes in accordance with the invention for creating, updating and deleting of objects. A class loader 602 will get index definitions from the byte code at 604 and obtain index definitions from the index heap at 606. At 608, the process will determine whether there are any new index definitions, and at 610 if new index definitions are found, the index heap will be locked at 612, the new index definitions will be registered at 614, and the index heap unlocked at 616. At 620, the process will seek changed index definitions; at 622 if any index definitions have changed the index heap will again be locked at 624. At 626 indexes may be dropped, and at 628 changed index definitions may be registered. At 630, the index heap will be unlocked again. At 632, a background job may be registered for re-indexing.

The invention employs a transaction model for managing objects that is different from that of a normal Java runtime environment, where no transaction management is required since an in-memory update is always successful or otherwise an exception is generated. However, the AFJRE of the invention is different and a different transaction model is employed. The invention affords two different models which may be used for implicit transactions and explicit transactions, respectively.

If the AFJRE does not detect an explicit transaction context, it may use an implicit model where field updates on a bean are atomic. Transactional consistency is not guaranteed for multiple updates on either the same or different beans. This means, for example, that an operation such as:

```
{
object.id=123
}
``` will be an atomic operation on the flash array, but that the operation:

```
{
object.id=123
object.name="foo"
}
``` will not be atomic and could be interrupted between the two updates so that only the first update would be persisted.

In an explicit transaction model, the transaction is explicitly executed as, for example:

```
{
AFTransaction.begin( )
object.id=123
object.name="foo"
AFTransaction.commit( )
}
```

The Java heap is a collection of memory locations in which dynamic program data is allocated and freed as needed by the program. The Java virtual machine's heap stores all objects created by a running Java application. The AFDB Java heap in accordance with the invention is constructed to enable instance data for an object to be quickly located, and to afford access to an object's class data in the method area given a reference to the object. The invention preferably has a single heap using the AFDB, and the Java method area is preferably implemented on top of the heap with a direct pointer reference. When a virtual machine needs memory for a freshly loaded class, it may take that memory from the same AFDB heap on which objects reside. Various approaches may be used to delete objects and reclaim memory. For instance, unreferenced objects may be deleted. A garbage collector that frees memory occupied by unreferenced objects may be used for finding and freeing (unloading) unreferenced classes. Object references may be managed inside of the stack in volatile memory, and can point to an object in the AFDB heap. The invention may query the AFDB heap to retrieve objects based upon a pointer reference.

The invention also affords a different garbage collection approach for persistent data in order to free up memory. Garbage collection on persistent data is only relevant in the case of a delete operation of an object. A delete operation may be initiated using, for instance, an object manager interface such as: ObjectManager.delete(Object object). In most cases, delete operations are transactional in nature. However, there are some situations where this is not possible. For example, if an object is used by other concurrent processes or applications, it may be undesirable to immediately delete it. However, it could be marked for deletion in a persistent queue, and a background process may remove the object asynchronously. Additionally, some objects may be referenced by other objects, and an object deletion will break referential integrity. In some cases, the invention may employ a forced delete to delete an object regardless of the existence of references to it.

FIGS. 7A-C illustrate an example of the deletion of an object using garbage collection, and memory compaction following deletion to free up memory. Referring to FIG. 7A, assume that a block of persistent memory 700 in the AFDB stores six objects O1-O6, and that one object O5, 702, is marked for deletion. As shown in FIG. 7B, following garbage collection (GC), object O5, 702, has been deleted as indicated by the dotted lines, and the location 704 in persistent memory 700 previously occupied by the object O5 is now vacant, as indicated by the dotted lines. Subsequent to deletion of object O5, a memory compaction operation may be performed to compact memory 700. As shown in FIG. 7C, compaction may move object O6, 710, to memory location 704 that was previously occupied by deleted object O5, thereby freeing up memory location 712 which was originally occupied by object O6. This compacts the objects O1-O4 and O6 into contiguous locations in memory 700, as shown.

Figure 8C:
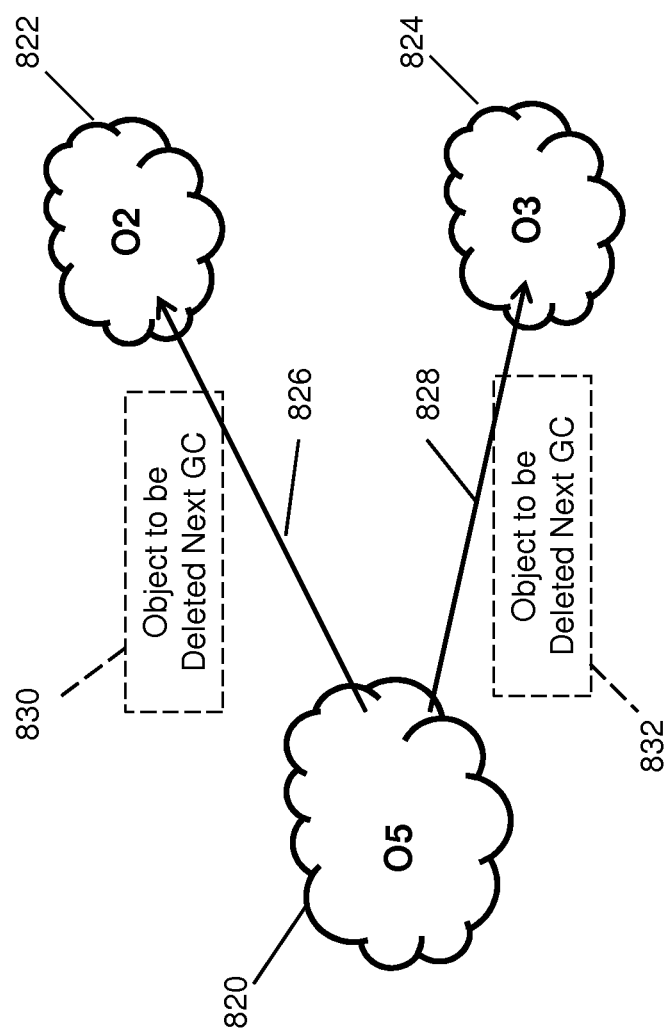

FIGS. 8A-C illustrate different ways in which an object may be indicated for deletion. One way to delete an object is by breaking references. This is illustrated in FIGS. 8A-B. Referring to FIG. 8A, an object O5, 802, may reference objects O2, 804, and O3, 806, as indicated at 810 and 812. As shown in FIG. 8B, following breaking of the references 810 and 812 to objects O2 and O3, respectively, object O5. 802, no longer has references and may be deleted by a garbage collection process.

FIG. 8C illustrates another approach to indicating an object for deletion. As shown, an object O5, 820, may reference a pair of objects O2, 822, and O3, 824, as indicated at 826 and 828. Object O5 may be affirmatively marked for deletion at the next garbage collection, and this may be communicated as shown at 830 and 832 to objects O2 and O3, respectively. At the next garbage collection, object O5 may then be affirmatively deleted. If desired, memory compaction as described above may then be performed.

As may be appreciated from the foregoing, the invention affords a new and different memory centric architecture for databases using persistent nonvolatile flash memory that takes advantage of the unique characteristics and efficiencies of flash memory, while addressing the requirements for flexibility, ease of data management and performance that are essential to databases employed in transactional environments. As such, an all flash database based upon this architecture affords a dramatically simpler and more efficient approach to database storage.

While the foregoing has been with reference to particular embodiments of the invention, it will be appreciated that changes to these embodiments may be made without departing from the principles of the invention, the scope of which is defined by the appended claims.

The invention claimed is:

1. A database system comprising;
   a non-volatile persistent flash memory database having memory locations for storing data objects;
   a compiler having object definitions for said data objects, the object definitions defining object properties of said data objects including which objects are to be stored in said non-volatile flash memory database, and having index definitions defining index structures for indexes of said data objects in said database, said object properties and said index structures being defined by bean annotations to said object definitions and to said index definitions; and
   a computer creating an all flash runtime environment in response to executable instructions from said compiler for storing, retrieving and managing the data objects and said indexes in the database, the executable instructions comprising said object definitions of said data objects and said index definitions for indexes of said data objects, wherein the executable instructions control the computer to create, index and store said data objects in said database and to find and manage said data objects in said database, and wherein said runtime environment is created so as to enable said data objects to be stored directly into and retrieved directly from said database.

2. The database system of claim 1, wherein said runtime environment is created by said computer to enable said data objects to be directly stored into and retrieved from said database without using intermediate page caches.

3. The database system of claim 1, wherein said runtime environment is created by said computer to include a garbage collector that deletes from said database a data object that is indicated for deletion.

4. The database system of claim 3, wherein said data object that is indicated for deletion comprises a data object that is either expressly marked for deletion by said object properties or that has no references.

5. The database system of claim 1, wherein said runtime environment created by said computer includes a memory compactor that organizes selected data objects into contiguous memory locations in said database to compact said database.

6. The database system of claim 1, wherein said runtime environment includes a virtual machine that provides an object heap for storing data object definitions and an index heap for storing index definitions.

7. The database of claim 1, wherein said object definitions specify attributes of said data objects, and said index definitions indicate starting storage locations in said database and lengths of said data objects.

8. A method of storing, retrieving and managing data objects in a non-volatile persistent flash memory database, comprising:
supplying to a compiler bean annotations comprising object definitions defining object properties of said data objects including which objects are to be stored in said non-volatile flash memory database and bean annotations comprising index definitions defining index structures for indexes of said data objects in said database, said object properties and said index structures being defined by the bean annotations to said object definitions and to said index definitions;
creating by a computer in response to executable instructions from said compiler an all flash runtime environment for storing, retrieving and managing said data objects and said indexes in the database, said executable instructions comprising said object definitions of said data objects and said index definitions for said indexes;
indexing and storing by the computer in response to receiving said executable instructions and said runtime environment said data objects in the database, wherein said runtime environment is created so as to enable said data objects to be stored directly into and retrieved directly from said database.

9. The method of claim 8, wherein said creating said runtime environment comprises creating the runtime environment to enable said data objects to be stored into and retrieved directly from said database without using intermediate page caches.

10. The method of claim 8 further comprising creating in said runtime environment a garbage collector that deletes from said database a selected data object that is indicated for deletion.

11. The method of claim 10, wherein said selected data object indicated for deletion is either expressly marked for deletion in said object properties or has no references.

12. The method of claim 8 further comprising compacting memory in said database by organizing data objects into contiguous storage locations.

13. The method of claim 8 further comprising creating in said runtime environment a virtual machine that includes an object heap for storing data object definitions and an index heap for storing index definitions.

14. The method of claim 13 further comprising creating index management byte code for creating an index, updating an index, deleting an index and performing an index lookup, and further comprising managing said indexes in said object heap using a persistent map that enables said indexes to be located.

15. The method of claim 14 further comprising storing said indexes in said database, and managing the indexes directly in the database.

16. The method of claim 8, wherein said compiler provides Java instructions to said computer.

17. Non-transitory computer readable media storing executable instructions for controlling a computer to perform a method of storing, retrieving and managing data objects in a non-volatile persistent flash memory database, comprising:
receiving by a computer instructions from a compiler, supplied with bean annotations for creating object definitions of said data objects and index definitions for indexes of said data objects, said bean annotations defining object properties of said data objects and said index definitions defining index structures for said indexes;
creating by the computer in response to receiving said object definitions and said index definitions from said compiler an all flash runtime environment for storing, retrieving and managing said data objects and said indexes in said database; and
indexing and storing by the computer in response to receiving said executable instructions and said runtime environment said persistent data objects in the database, wherein said runtime environment is created so as to enable said data objects to be directly stored and retrieved from said database.

18. The non-transitory computer readable media of claim 17 further comprising instructions for creating in said runtime environment a garbage collector that deletes from said database a data object that either marked for deletion or has no references.

19. The non-transitory computer readable media of claim 17 further comprising creating in said runtime environment a virtual machine that includes an object heap for storing persistent data object definitions and an index heap for storing index definitions.

20. The non-transitory computer readable media of claim 17 further comprising instructions for creating index management byte code for creating an index, updating an index, deleting an index and performing an index lookup, and further comprising instructions for managing said indexes in said object heap using a persistent map that enables said indexes to be located.

* * * * *